United States Patent
Yamamoto et al.

(10) Patent No.: US 6,860,082 B1
(45) Date of Patent: Mar. 1, 2005

(54) HEAT INSULATING WALL MEMBER, AND METHOD OF MANUFACTURING THE SAME

(75) Inventors: Naotaka Yamamoto, Fujisawa (JP); Seiichiro Kitou, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/548,277

(22) Filed: Apr. 12, 2000

(30) Foreign Application Priority Data

Apr. 12, 1999 (JP) ......................................... H11-104392
Apr. 12, 1999 (JP) ......................................... H11-104393

(51) Int. Cl.[7] .............................. B60P 3/20; F25D 23/06
(52) U.S. Cl. .................... 52/794.1; 52/309.9; 52/406.1; 52/407.1; 52/407.5; 52/742.13; 52/745.19; 312/406
(58) Field of Search ............................. 52/794.1, 793.1, 52/309.8, 309.9, 406.1, 407.1, 407.5, 742.11, 742.13, 745.19; 312/406; 428/69, 71, 316.6

(56) References Cited

U.S. PATENT DOCUMENTS

| | | | |
|---|---|---|---|
| 2,951,004 A | * | 8/1960 | Martin et al. |
| 3,264,165 A | * | 8/1966 | Stickel |
| 3,984,957 A | * | 10/1976 | Piazza |
| 4,513,041 A | * | 4/1985 | Delluc |
| 4,529,638 A | * | 7/1985 | Yamamoto et al. |
| 4,669,632 A | * | 6/1987 | Kawasaki et al. |
| 4,681,788 A | * | 7/1987 | Barito et al. |
| 4,798,753 A | * | 1/1989 | Abuaf et al. |
| 5,018,328 A | * | 5/1991 | Cur et al. |
| 5,032,439 A | * | 7/1991 | Glicksman et al. |
| 5,044,705 A | * | 9/1991 | Nelson |
| 5,082,335 A | * | 1/1992 | Cur et al. |
| 5,756,179 A | | 5/1998 | Jutte |
| 5,875,599 A | | 3/1999 | McGrath et al. |
| 5,904,972 A | * | 5/1999 | Tunis et al. |
| 6,021,612 A | * | 2/2000 | Dunn et al. |

FOREIGN PATENT DOCUMENTS

EP 591849 * 4/1994 ................. 52/794.1

* cited by examiner

Primary Examiner—Robert Canfield
(74) Attorney, Agent, or Firm—Antonelli, Terry, Stout & Kraus, LLP

(57) ABSTRACT

A heat insulating wall, and a method of manufacturing the same. A laminated body includes a first panel, a first plate-shaped insulating member made of plastic foam and having a predetermined thickness, a vacuum insulation member mounted on the insulating member, a second plate-shaped insulating member made of plastic foam, and a second panel. The area between the first and second panels surrounded by the first plate-shaped insulating member, the vacuum insulation member, and the second plate-shaped insulating member is filled with expanded plastic foam. The thickness of the first and second plate-shaped insulating members is set to a predetermined thickness S.

20 Claims, 10 Drawing Sheets

Fig. 1
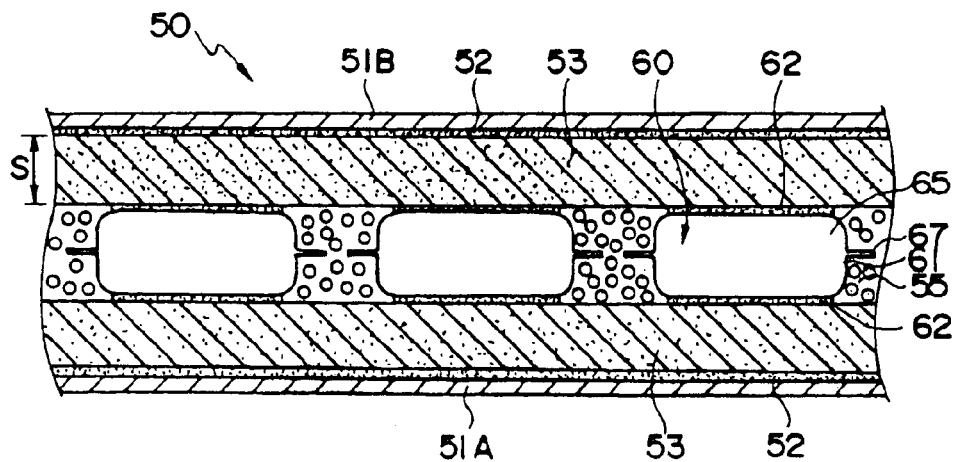
Fig. 2A
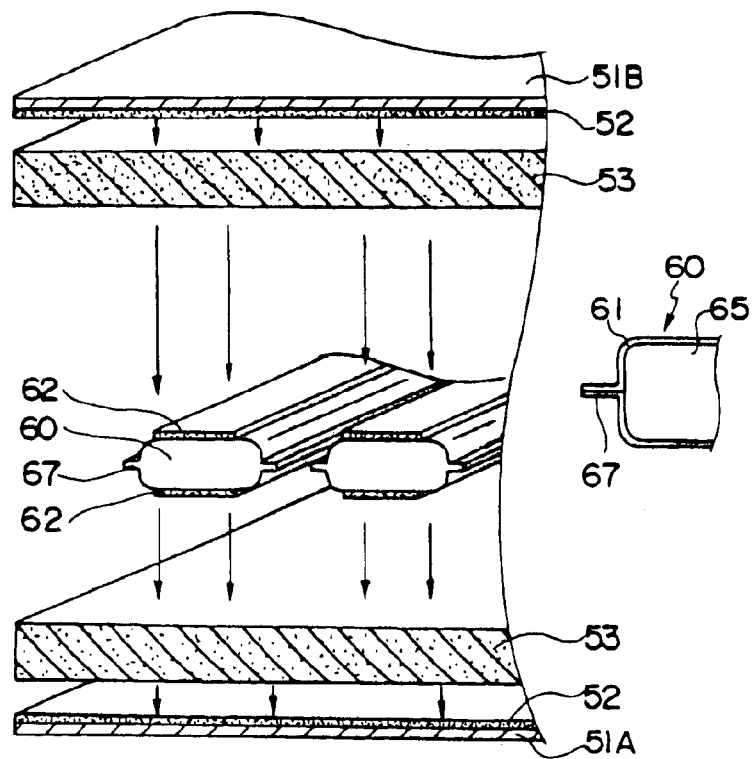
Fig. 2B

Fig. 8
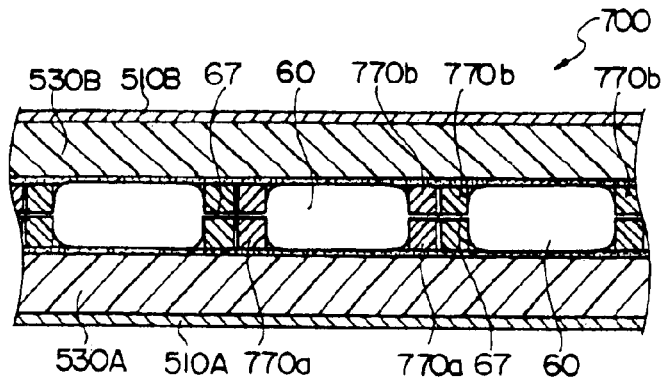
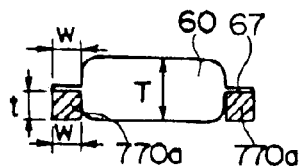
Fig. 9A
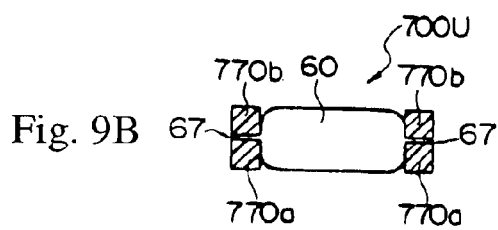
Fig. 9B
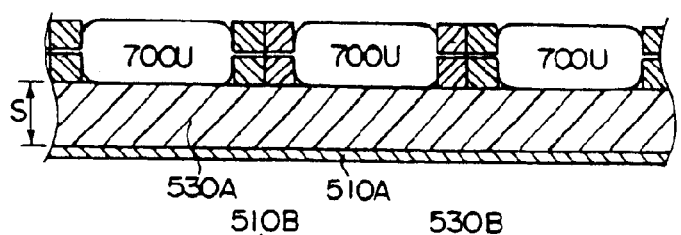
Fig. 9C
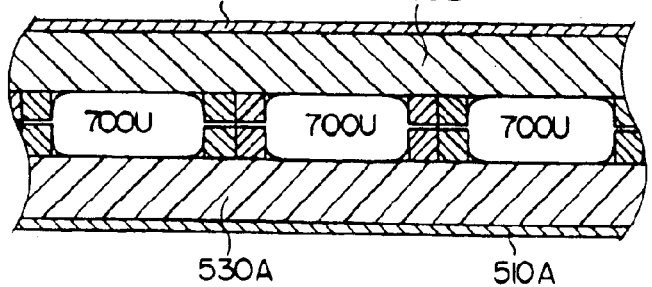
Fig. 9D Fig. 12
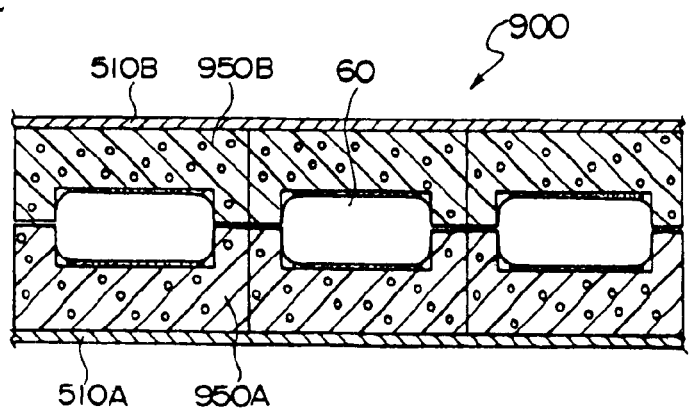
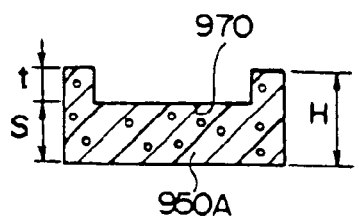
Fig. 13A
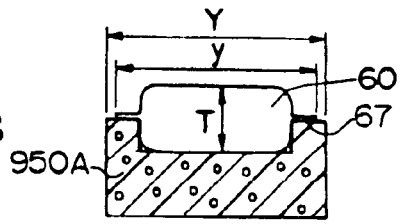
Fig. 13B
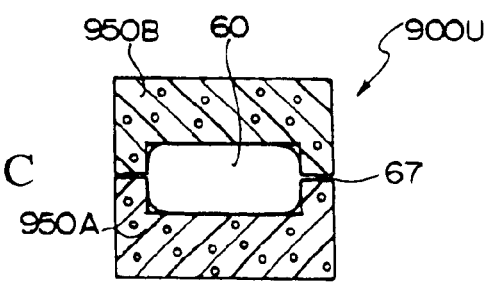
Fig. 13C
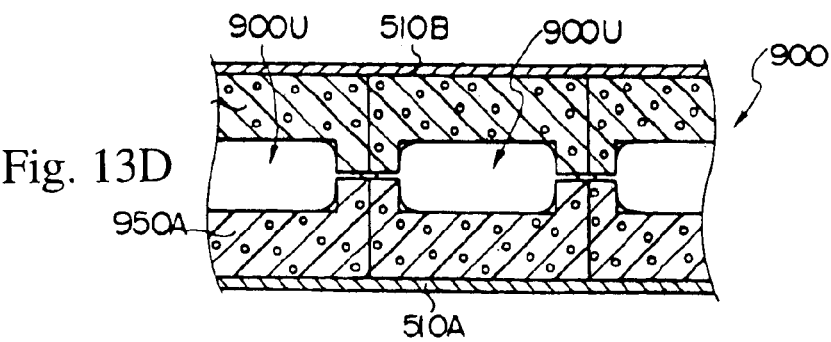
Fig. 13D

HEAT INSULATING WALL MEMBER, AND METHOD OF MANUFACTURING THE SAME

FIELD OF THE INVENTION

The present invention relates to a wall including a vacuum insulation panel (member) to be used in a heat insulating transportation container of a vehicle, enabling cold reservation and refrigeration.

BACKGROUND OF THE INVENTION (1) As shown in FIG. 14, a heat insulating wall 13 of a body 15 in a refrigeration vehicle or cold reservation vehicle 10 typically has the structures disclosed in the following:

a. A sandwich panel 13A formed by adhering a slab 131, made of expanded urethane foam or expanded styrene foam or the like (already expanded and formed into a plate-shape), to inner and outer panels 13a, 13b, made of a plate-shaped flattened aluminum material, FRP, or steel, by use of an adhesive 13c; or b. A panel 13B shown in FIG. 15, where an independent expanding urethane resin is injected and expanded between inner and outer panels 13a, 13b to form a portion 133, and the inner and outer panels are bonded with the self-adhering force of urethane.

Normally, the heat insulating walls 13 of the body 15 are assembled into a box-shape, with the six walls, the ceiling, the floor, the two side walls, the front wall and the rear door, being formed with the above mentioned panels (13A or 13B) having either the structure mentioned in a. or in b.

(2) One desire is that the heat-insulating container of vehicles have increased capacity within the container (body).

In order to increase the capacity of the container easily, the width and the height of the container should be enlarged. However, the outer frame size of the container is limited by regulations.

Therefore, in order to increase the inner size of the container without increasing the outer frame size of the container, there is a need to decrease the thickness of the wall (insulating member).

Of course, in order to decrease the thickness of the wall without deteriorating the insulation performance, it is indispensable to improve the insulating characteristics of the wall.

One way to improve the heat insulation performance of the wall is to apply to the wall a vacuum insulation panel having a lower heat transfer rate than the conventionally used expanded plastic foam material.

The heat conductivity of heat insulating materials is shown in Table 1.

TABLE 1

| Sample Materials | Heat conductivity [kcal/m · h · °C.] |
|---|---|
| Polyurethane foam | 0.020–0.022 |
| Polystyrene foam | 0.024–0.034 |
| Vacuum insulation panel (filled with continuous expanded urethane foam, degree of vacuum: $10^{-2}$ Torr) | approximately 0.007 |
| Continuous expanded urethane foam unit (without aluminum laminated film, atmospheric pressure) | approximately 0.045 |

Based on the heat transfer rate values shown in the above table, when calculating the necessary thickness of the heat insulating material when replacing the conventional polystyrene foam with a vacuum insulation material, the same heat insulating performance is obtained with the thickness of the wall reduced to approximately ¼.

As explained, by utilizing a vacuum insulation member, the thickness of the insulating wall may be reduced without deteriorating the insulating performance. Therefore, the capacity within the container may be increased, and the weight of the container may be reduced.

Even further, when the vacuum insulation material is employed in the wall without changing the thickness of the wall, the heat insulating performance may be quadrupled, and the fuel consumption rate will be improved.

For the above reasons, a wall including vacuum insulation material is already applied to portions of domestic (home) refrigerators. The wall structure applied to a domestic refrigerator utilizing vacuum insulation panels is explained with reference to FIG. 16.

In a domestic refrigerator 20, vacuum insulation panels 25 are incorporated in the outer walls 24 of a cooling chamber 21, a refrigerating chamber 22 and a vegetable chamber 23, the interior temperature of which must be maintained at about 4–5° C. or at about –18° C.

The vacuum insulation panel 25 is formed by placing a continuous expanded urethane foam 25a inside a bag 25b made of aluminum laminated film, and under vacuum condition the bag is airtightly sealed by a seal portion 25c. The outer panel 24 of the refrigerator is formed by placing the vacuum insulation panel 25 between a flat steel outer plate 24a and a molded inner plate 24b made of three-dimensionally deformed ABS resin and the like formed by vacuum molding. The vacuum insulation panel 25 is fixed to the outer panel 24a by a hot-melt adhesive or a double-coated tape. An independent expanding urethane foam 24c is injected and expanded in the space formed between the vacuum insulation panel 25, the inner panel 24b and the outer panel 24a.

In the wall structure, the bond between the outer panel 24a, the inner panel 24b, the aluminum laminated film 25b and the independent expanding urethane foam 24c is stronger than the self-adhering power of the urethane foam. Therefore, in a domestic refrigerator, there is no need to bond the materials by use of fastening members such as rivets.

These types of vacuum insulation panels are disclosed for example in Japanese Patent Publication Nos. 61-17263, 1-46759, and 3-23825.

The present invention aims at solving the problems related to using a vacuum insulation panel for a heat insulating travel container, which differs from the domestic refrigerator in the environment of use and the manufacturing method.

1) During transportation of the heat insulating travel container, the container is vibrated and deformed when traveling on a rough path or riding over a curbstone or the like, and this causes the wall to receive a bending or torsional load. In the wall structure of a domestic refrigerator, as explained, the vacuum insulation panel is adhered to the outer panel. When such a load is added to the wall, the stress will be directly transmitted to the vacuum insulation panel, and the intensity of the film may not bear such stress. As a result, the film may be torn. When the film is torn, the panel can no longer maintain a vacuum condition, and the heat insulating performance of the vacuum insulation panel is deteriorated.

Accordingly, when the vacuum insulation panel is utilized as a component of a wall for a heat insulating travel container, the vacuum insulation panel should be positioned near the center of thickness of the wall, so that when bending or torsional load is added to the wall, only a small stress is transmitted to the film of the vacuum insulation panel.

2) Generally, a forklift is utilized for loading the cargo in and out of the refrigerated travel container. At this time, there is fear that the claws of the forklift may bump into the insulating wall, or obstacles outside the container may hit the wall, causing damage to the outer panel.

If the vacuum insulation panel is positioned close to the outer or inner panels of the insulating wall, damage to the panels may cause the film to break, and the insulating performance of the vacuum insulation panel may be deteriorated.

Accordingly, when the vacuum insulation panel is used as a component forming the wall utilized in the heat insulating travel container, the vacuum insulation panel must be positioned in the center of thickness of the wall.

3) Moreover, various parts, rails and angles are fixed to the inner and outer panels of the container by fastening members (rivets). A pull-stem type rivet is normally used for the heat insulating container. Other rivets include a solid-type, a full-tubular type, a semi-tubular type, a split-type, a compression-type, a blind rivet and the like.

With reference to FIGS. 17 and 18, the method of fixing a pull-stem type rivet is explained.

A rib 16, a doorframe 17 and the like are mounted to the inner panel 130a and the outer panel 130b of the heat insulating travel container 15.

The method of fixing the rib 16 is explained.

A base hole 130c is formed in the inner panel 130a (or the outer panel 130b) with a drill. Thereafter, a rivet 18 is inserted into the hole, and the rivet is pulled and fixed by a riveter. This may cause no trouble to the sandwich panel, but if the vacuum insulation panel 25 is placed between the inner and outer panels 130a, 130b, and film 25b of the panel 25 may be damaged when drilling the base hole or when inserting the rivet into the hole.

Normally, a stopper is provided to the drill so as not to drill too deep, but the position of the stopper differs according to each manufacturer, and the depth of the base hole is not regular. For example, in this type of walls, the drill is provided with a stopper that stops the drill at a depth of 15 mm. In other words, the rivets could not be fixed to a base hole shorter than approximately 15 mm. Therefore, the vacuum insulation material should be placed in the center of thickness of the wall, with distances of 15 mm+a away from the inner and outer panels, respectively. The clearance size a should be set to approximately 10 mm, for safety when forming a base hole.

Other than the above members, parts that may be fixed to the heat insulating wall include the following: (The problems that are related to mounting these parts are the same as those for the rivet.)

- a lashing rail (fixed to the inner panel) for fixing a lashing belt which prevents the cargo inside the container from moving due to vibration or the starting or the stopping of the vehicle;
- a pallet guide (fixed to the inner panel) preventing the cargo inside the container from bumping into the side walls due to vibration or the starting or the stopping of the vehicle;
- an air rib (fixed to the inner panel) for accelerating the dispersion of cool air within the container; and
- an angle fixed to the interior and a rail fixed to the exterior of the corner portion, joining the walls together.

(5) The conventional methods for determining the necessary distance between the vacuum insulation panel and the inner and outer panels, and the method of fixing the panel in position including the following:

1) Japanese Laid-Open Utility Model Application No. 4-68989 discloses placing a single-body vacuum insulation panel inside a flat panel-shaped mold and injecting a urethane foam material around the insulation panel, so as to manufacture a vacuum insulation panel unit with a urethane cover. The unit is placed between inner and outer panels. In this case, the vacuum insulation panel placed within the model for injection tended to move around the mold due to the expanding pressure of the urethane material, and it was very difficult to fix the vacuum panel in a determined position at the center of thickness of the wall material.

2) Japanese Patent Publication No. 2-9272 discloses a method of spraying a urethane foam on the inner panel or the outer panel, and while the urethane foam is gelling or expanding, adhering a vacuum insulation panel to the urethane material.

According to the disclosed technique, there is a large dispersion in the state of expansion of the sprayed foam, and it is difficult to fix the vacuum panel in a determined position away from the inner panel or the outer panel.

3) Japanese Utility-Model Publication Nos. 1-20631 and 3-38628 disclose a wall formed by adhering a deforming sponge or plastic resin to inner and outer panels, and mounting a vacuum Insulation panel on that layer. A urethane foam material is injected around the vacuum panel, so as to cover the outside of the panel. However, since the deforming sponge and deforming plastic resin are deformed by the expanding pressure of the urethane foam, it is difficult for the vacuum panel to be fixed in a determined position away from the inner and outer panels.

4) Japanese Laid-Open Patent Applications Nos. 3-233285, 8-14484 and 8-14486 disclose fixing a vacuum insulation panel in a desired position in the width of a wall by a fixing jig. However, since the fixing jig itself has a very high heat conductivity, a heat-bridge is generated within the wall, and it is difficult for the wall to provide a sufficient heat insulating performance.

SUMMARY OF THE INVENTION

Therefore, in order to solve the above-mentioned problems, the present invention provides a wall structure for a heat insulating container of a vehicle, adopting a wall structure including a vacuum insulation panel mounted in a predetermined position away from the inner and outer panels, for example at the center of width of the wall. The wall structure of a container according to the invention is advantageous in that the vacuum insulation panel maintains a high heat insulating performance.

The heat insulating wall including vacuum insulation members according to the present invention comprises a first panel, a first heat insulating material mounted on said first panel, one or more vacuum insulation members arranged on said first heat insulating material, a second heat insulating material mounted on said vacuum insulation member, a second panel mounted on said second heat insulating member, and a filler insulating member for filling areas surrounded by said first heat insulating material, said vacuum insulation member and said second heat insulating material, wherein the thickness of said first and second heat insulating materials are set to a predetermined size.

The heat insulating wall according to another aspect of the invention comprises a first panel; first pillar-shaped heat insulating materials made of hard plastic foam arranged on the first panel with predetermined intervals between one another, the width of the first insulating materials being set to approximately the same width as the vacuum insulation members, and the thickness thereof being set to a predetermined size; vacuum insulation members each arranged on the first pillar-shaped heat insulating materials; second pillar-shaped heat insulating materials made of hard plastic foam in a shape similar to that of the first insulating materials and mounted on the vacuum insulation members; and a second panel mounted on the second pillar-shaped heat insulating members; and an expanding plastic foam for filling areas surrounded by the first pillar-shaped heat insulating materials, the vacuum insulation members and the second pillar-shaped heat insulating materials between the first panel and the second panel.

The heat insulating wall according to other aspects of the invention includes structures where the vacuum insulation members are adhered to the heat insulating materials by a soft adhesive, where the plate-shaped heat insulating members or the pillar-shaped heat insulating members are formed of hard plastic foam, or where the vacuum insulation member is sandwiched between the first and second pillar-shaped heat insulating materials to constitute a unit body.

The heat insulating wall according to another aspect of the invention comprises a first panel, a first plate-shaped heat insulating material formed of a non-expanding plastic foam formed to have a predetermined thickness and mounted on the first panel, vacuum insulation members arranged on the first plate-shaped heat insulating material, a second plate-shaped heat insulating material made of a non-expanding plastic foam formed to have a predetermined thickness and mounted on the vacuum insulation members, a second panel mounted on the second plate-shaped heat insulating member, and non-expanding plastic foam materials mounted to areas surrounded by the first heat insulating material, the vacuum insulation members and the second heat insulating material between the first panel and the second panel, wherein seal portions of the vacuum insulation members are supported by the filling insulation materials.

The heat insulating wall according to another aspect of the invention comprises a first panel having fixed thereto a first plate-shaped insulating material, a second panel having fixed thereto a second plate-shaped insulating material, and vacuum insulation member units mounted between the first plate-shaped insulating material and the second plate-shaped insulating material, wherein the units each comprise a vacuum insulation member and seal support portions for supporting the seal portions of the vacuum insulation member.

The thickness of the first and second plate-shaped heat insulating materials is set to a predetermined size. Further, the first and second plate-shaped heat insulating materials and the seal supporting portions are made of non-expanding plastic foam.

Moreover, the seal support means of the seal support portion of the vacuum insulation member unit includes a first seal support portion and a second seal support portion. In another example, the seal support means of the seal support portion of the vacuum insulation member unit is a concave portion.

The insulating wall according to another aspect of the invention comprises a first panel, a second panel, and vacuum insulation member units fit and stored in first and second storage portions formed between first and second plates, wherein the distance between the first panel and the bottom of the fitting portion of the first storage portion, and the distance between the second panel and the bottom of the fitting portion of the second storage portion are both set to a predetermined size (equal to the depth of a base hole for inserting a fastening member plus an appropriate clearance).

The method of manufacturing a heat insulating wall according to another aspect of the invention comprises a first plate-shaped heat insulating material positioning step of adhering and fixing a first plate-shaped heat insulating material onto a first panel, a second plate-shaped heat insulating material positioning step of adhering and fixing a second plate-shaped heat insulating material onto a second panel, a vacuum insulation member positioning step of sandwiching the vacuum insulation members with the first and second plate-shaped heat insulating materials, and an expanding plastic filling step of injecting liquid-plastic into a gap between the first and second plate-shaped heat insulating materials and letting the plastic foam, wherein the vacuum insulation members are arranged with appropriate intervals therebetween so that proximal vacuum insulation members do not come into contact with each other, and the first and second plate-shaped heat insulating materials have a predetermined thickness.

The method of manufacturing a heat insulating wall according to another aspect of the invention comprises a first pillar-shaped heat insulating material positioning step of adhering and fixing first pillar-shaped heat insulating materials onto a first panel, a vacuum insulation member positioning step of mounting vacuum insulation members to the first pillar-shaped heat insulating materials, a second pillar-shaped heat insulating material positioning step of adhering and fixing second pillar-shaped heat insulating materials onto the vacuum insulation members, a second panel positioning step of mounting a second panel onto the second pillar-shaped heat insulating materials, and an expanding plastic filling step of injecting liquid-plastic into a gap between the first and second panels and letting the plastic foam, wherein the first pillar-shaped heat insulating materials to which the vacuum insulation members are mounted are arranged with appropriate intervals therebetween so that proximal vacuum insulation members do not come into contact with each other, and the first and second pillar-shaped heat insulating materials have a width which is roughly the same as the width of the vacuum insulation member.

The method according to another aspect of the invention comprises a unit forming step of forming a unit by sandwiching a vacuum insulation member with first and second pillar-shaped heat insulating materials, wherein the units are arranged between a first panel and a second panel, and liquid plastic is injected and expanded in a gap between the first panel and the second panel.

The method according to another aspect of the invention comprises a first plate-shaped heat insulating material positioning step of adhering and fixing a plate-shaped heat insulating material made of non-expanding plastic foam onto a first panel; a vacuum insulation member positioning step of arranging, on the first plate-shaped heat insulating member, filling heat insulation members made of non-expanding plastic foam including first and second members for sandwiching and supporting the seal portions of adjacent vacuum members; and a pressurization step of positioning, on the vacuum insulation members, a second panel to which are adhered and fixed a plate-shaped heat insulating material made of non-expanding plastic foam; wherein the thickness of the plate-shaped heat insulating materials adhered to the first and second panels is set to a predetermined size.

The method according to another aspect of the invention comprises a first plate-shaped heat insulating material positioning step of adhering and fixing a plate-shaped heat insulating material formed of non-expanding plastic foam and having a predetermined thickness onto a first panel, a second plate-shaped heat insulating material positioning step of adhering and fixing a plate-shaped heat insulating material formed of non-expanding plastic foam and having a predetermined thickness onto a second panel, a unit forming step of assembling a vacuum insulation member unit comprising a vacuum insulation member and a seal support portion for supporting the seal portion of the vacuum insulation member, and a pressurizing step of sandwiching the vacuum insulation member unit with the first and second panels to which are fixed the plate-shaped insulating materials, and adhering the unit in position.

According to other aspects of the method, the seal support portion for supporting the seal portions of said vacuum insulation member may include a first support portion and a second support portion, which support the seal portions to form the vacuum insulation member unit, or a concave portion capable of supporting the seal portion, and the vacuum insulation member unit may be formed by inserting said seal portion to the concave portion of said support portion.

The method according to another aspect of the invention comprises a unit forming step of storing a vacuum insulation member within an insulation storage portion, formed of first and second storage portions each having a fitting portion, so as to form a unit; and a pressurizing step of sandwiching the vacuum insulation member unit with a first panel and a second panel, and fixing the unit in position.

The above method is characterized in that both the distance between the first panel and the bottom of the fitting portion of the first storage portion and the distance between the second panel and the bottom of the fitting portion of the second storage portion are set to a predetermined size (equal to the depth of the base hole for inserting a fastening member plus an appropriate clearance).

BRIEF DESCRIPTION OF THE DRAWINGS

FIG. 1 is a cross-sectional view of a heat insulating wall according to the present invention;

FIGS. 2A and 2B are explanatory views showing the structure of an insulating wall according to the present invention;

FIG. 8 is a cross-sectional view showing the wall according to embodiment 5 of the invention;

FIGS. 9A–9D are an explanatory views of FIG. 8;

FIG. 12 is a cross-sectional view of the heat insulating wall according to embodiment 6 of the invention;

FIGS. 13A–13D are explanatory views of FIG. 12;

DETAILED DESCRIPTION OF PREFERRED EMBODIMENTS

Figure 3:
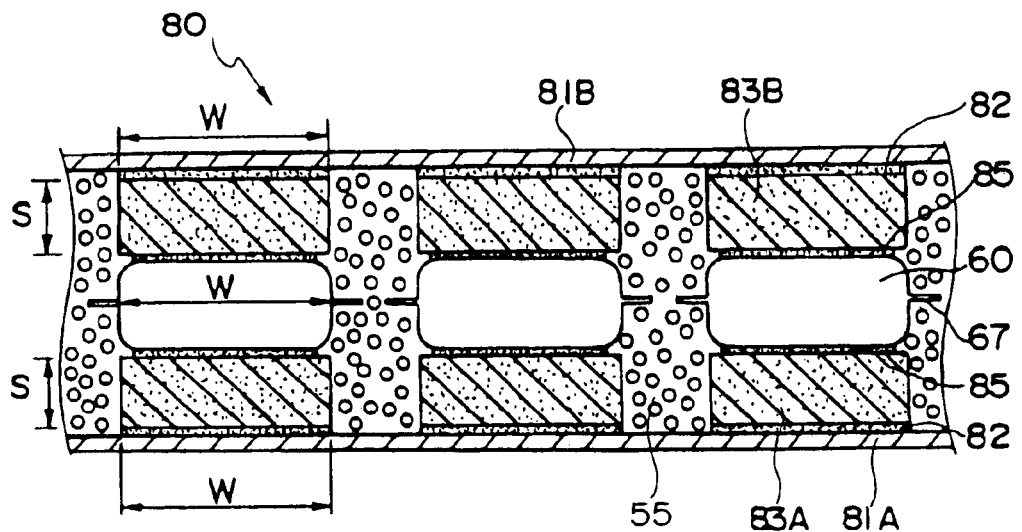
FIG. 3 is a cross-sectional view showing another embodiment of the insulating wall according to the invention.

The preferred embodiments according to the present invention will now be explained with reference to the accompanied drawings.

(Embodiment 1)

FIG. 1 shows a cross-sectional view of a wall according to the first embodiment of the present invention. FIGS. 2A and 2B show the structure of that wall.

A wall 50 comprises a first panel 51A and a second panel 51B acting as an outer panel and an inner panel, slab material members 53 made of a heat insulating material, and a vacuum insulation member 60.

The plate-shaped slab material members 53, having a heat insulating effect are adhered to the first panel 51A and the second panel 51B. The plate-shaped slab material members 53 are made of hard-type plastic foam such as styrene foam or urethane foam. The thickness S of each material member 53 is equal to or greater than the size of a base hole plus a clearance amount a. For example, if the size of the base hole is 15 mm and the clearance amount (a) is 10 mm, the size S is equal to or greater than 25 mm.

An adhesive 52 for the first and second plates 51A, B and the slab material members 53 may be thermoplastic adhesive (vinyl acetate system, acrylic system, polyamide system, polyester system, polyurethane system, etc.,) hot-setting adhesive (amino system, urea system, melamine system, phenol system, resorcylic system, xylene system, furan system, epoxy system, urethane system, acryl system, unsaturated polyester system, etc.,) hot-melting adhesive (including reaction setting adhesive,) rubber-system adhesive, cyanoacrylate adhesive, synthetic water-soluble adhesive, emulsion adhesive, liquid polymer adhesive, and so on.

Especially, when taking into consideration the heat increase (approximately 80–90° C.) caused by the insulation outside, adhesives having heat resisting property, such as hot-setting urethane adhesive, expoxy adhesive or reaction-setting hot-melting adhesive are preferred.

Further, of the above-listed adhesives, the adhesives including a solvent tend to dissolve the plastic foam by the solvent included, or the solvent may diffuse after adhesion and cause exfoliation of the adhesive. Therefore, adhesives having no solvents included are preferred.

The vacuum insulation member 60 is positioned between the slab member 53 of the first panel 51A and the slab member 53 of the second panel 51B.

The slab material members 53 and the vacuum insulation member 60 are adhered by an adhesive 62. In this case, the adhesive may be thermoplastic adhesive (vinyl acetate system, acrylic system, polyamide system, polyester system, polyurethane system, etc.,) hot-setting adhesive (amino system, urea system, melamine system, phenol system, resorcylic system, xylene system, furan system, epoxy system, urethane system, acryl system, unsaturated polyester system, etc.,) hot-melting adhesive (including reaction setting adhesive,) rubber-system cyanoacrylate adhesive, synthetic water-soluble adhesive, emulstion adhesive, liquid polymer adhesive, and so on.

The vacuum insulation member 60 is formed by coating an aluminum-laminated film 61 to continuously expanded foam 65 made of synthetic resin, and sealing the same at a seal portion 67 so as to provide a vacuum state.

The aluminum-laminated film 61 is a laminated body made of a nylon layer, a polyester resin layer to which is evaporated aluminum (AL), an AL leaf layer, and a polyethylene layer. The total layer thickness is 83 $\mu$m.

The filling to the aluminum-laminated film 61 may be continuous expanded urethane foam of the organic system and other continuous expanded foams made of resin (polystyrene, polyethylene, polypropylene, phenol, urea, ABS, vinyl chloride, nylon, ethylene-vinyl acetate, rubber, etc.,) and form pearlite of the inorganic system, silica balloon, glass micro balloon, silica, hydrate silicate, calcium silicate, diatomaceous earth, methylation silicate, magnexium carbonate, alumina silicate, carbon foam, fiber wool (glass wool, asbestos, ceramic fiber, cotton wool, polyester wool, silica-alumina wool, etc.,) and the like.

The degree of vacuum inside the film 61 of the vacuum insulation member 60 is not especially defined, but preferably from the point of view of insulation effect and the time to reach the vacuum state, it may approximately be $10^{-2}$ Torr.

Moreover, a getter agent is placed in the interior of the vacuum insulation member 60. The getter agent is for adsorbing the gas that otherwise prevents the member from maintaining the degree of vacuum. The agent may be an adsorption type of activated carbon or zeolite, or may be chemical-reaction adsorption type.

The vacuum insulation member 60 is placed so that it maintains an appropriate interval with proximate vacuum insulation members 60, so as not to contact the other members 60.

The portion surrounded by the slab material 53 and the vacuum insulation member 60 is filled with an urethane foam 55 formed by injecting and expanding urethane resin. The urethane foam 55 is adhered to the upper and lower panels 51A, B, the slab material 53, and the vacuum insulation member 60 by self-adhesion.

The method of manufacturing the wall 50 is now explained with reference to FIG. 2.

(1) The slab material members 53 are adhered to panel 51A and panel 51B, respectively.

The plate-shaped slab material members 53 made of plastic foam (styrene form, urethane foam and the like) with a plate thickness S of approximately 25 mm are adhered at their contact surfaces to the first and second panels 51A and 51B through the adhesive 52. Thereby, the first panel 51A to which the slab material member 53 is adhered and the second panel 51B to which the slab material member 53 is adhered are manufactured.

(2) Thereafter, the vacuum insulation members 60 are adhered to the slab material 53 fixed to the first panel 51A, with even intervals between the members 60, so that they do not come into contact with one another.

The adhesive 62 may either be applied to both surfaces of the vacuum insulation member 60, or may be applied to the whole surface of the slab material member 53, before placing the vacuum insulation members 60 in the predetermined positions.

(3) The slab material member 53 fixed to the second panel 51B is placed on top of the vacuum insulation member 60, and fixed thereto by pressurized adhesion.

Actually, the adhesive 62 is either applied on the upper surface of the vacuum insulation member 60 before performing the pressurized adhesion, or the adhesive 62 is applied to the whole surface of the slab material member 53 fixed on the second panel 51B before placing it on the vacuum insulation panel 60 and performing the pressurized adhesion.

Thereby, the vacuum insulation member 60 is sandwiched between the first plate 51A with the slab material member and the second plate 51B with the slab material member.

(4) After adhering the first and second panels 51A, B with the slab material members 53 to both sides of the vacuum insulation member 60, a urethane foam material-liquid is injected into the spaces surrounded by the vacuum insulation panel 60 and the slab material members 53 made of plastic foam (insulating material).

The injected urethane foam material-liquid fills complicated spaces, such as the area around the heat seal portion 67 of the member 60 and the small gap between the member 60 and the plastic foam slab material members 53, and expands. Then, by self-adhesion or by use of an adhesive, it is adhered to the surrounding members.

The heat insulating wall 50 manufactured as above may position the vacuum insulation member 60 approximately in the center of the wall thickness and separated by a distance (25 mm) from the inner and outer panels (51A, 51B) having predetermined sizes, by setting the thickness S of the slab material members 53 on the first and second (inner and outer) panels to a predetermined size (for example, 25 mm). Further, since a urethane material-liquid is filled by injection into the spaces within the wall, there will be no spaces having high heat conductivity formed in the wall. Therefore, the present method provides a wall structure member with good heat insulating characteristics.

Moreover, since the vacuum insulation member 60 is placed approximately in the center area of the wall thickness of the wall structure member 50, the loads on the wall, such as vibration when used for vehicles, bending or torsion caused by deformation, or outer damage to the wall caused by the claws of a forklift or the like, will not reach the film. Therefore, outer damage will not reach the vacuum insulation member 60 easily. Further, since the plate-thickness of the slab material members 53 is greater than the base hole size, riveting performed when manufacturing the insulating container will not damage the vacuum insulation member 60.

In the present embodiment, the adhesive 62 applied on both sides of the insulation member 60 should preferably be soft. That is, when using the completed container, and a load is added to the wall 50, the adhesive may deform or expand to correspond to the load, and only very limited stress reaches the aluminum-laminated film 61 of the member 60.

The soft adhesive may preferably be RT-16 (trademark) manufactured by Japan NSC K. K.

As explained, the wall or the manufacturing method of the wall shown in the present embodiment is advantageous in that the vacuum insulation members 60 may be securely mounted in a position away from the inner and outer plates 51A, 51B by a predetermined distance (base hole size for riveting plus a clearance amount a) so that they receive little outer influence. Moreover, the insulating characteristics of the vacuum insulation members 60 positioned approximately at the center of thickness of the wall will not be damaged by vibration, torsion or outer forces. Therefore, a secure insulation is provided.

(Embodiment 2)

Figure 4:
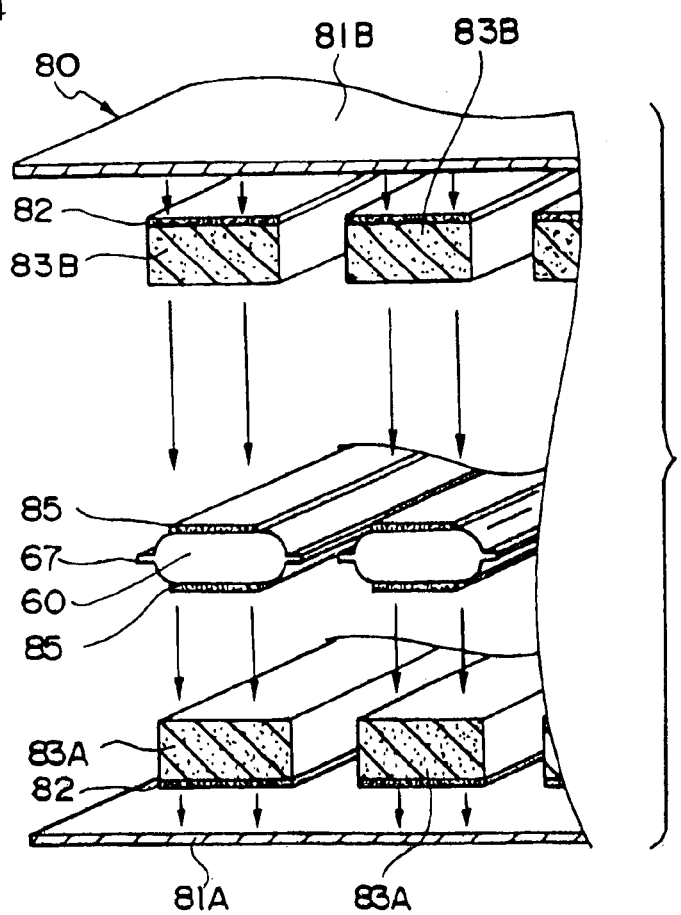
FIG. 4 is an explanatory view of the structure of FIG. 3.

The present embodiment provides another wall structure capable of fixing the vacuum insulation member to a predetermined position, and a method of manufacturing the same (refer to FIGS. 3 and 4).

The wall 80 shown in the present embodiment includes vacuum insulation members 60 sandwiched by slab materials 83 having roughly the same size as the vacuum insulation members.

The method of manufacturing the wall 80 will now be explained.

(1) A plurality of pillar-shaped first slab (insulating) material members 83A formed of hard plastic foam with a thickness S (for example, 25 mm) and a width W equal to the width W of the vacuum insulation member 60 are adhered to the first panel 81A acting as the outer panel.

The first slab material members 83A are positioned at appropriate intervals.

The adhesive 82 is either applied only to the adhesion surface of the first slab material members 83A, or to the whole surface of the first panel 81A.

(2) The adhesive 85 is applied on the first slab material members 83A. Then, the vacuum insulation members 60 are placed and adhered thereto.

(3) The adhesive 85 is applied on top of the vacuum insulation members 60, and pillar-shaped second slab (insulating) members 83B having the same size as the first slab material members 83A are mounted for adhesion by the adhesive.

At this stage, the vacuum insulation members 60 sandwiched with the pillar-shaped first slab materials 83A and the pillar-shaped second slab materials 83B are fixed with even intervals.

(4) The adhesive is applied on top of the second slab material members 83B, and the second panel 81B is fixed thereto by pressurized adhesion. Alternatively, the adhesive 82 may be applied to the whole surface of adhesion of the second panel 81B.

(5) After adhesion, a urethane foam material-liquid is injected into the spaces surrounded by the vacuum insulation members 60 sandwiched between the first slab material members 83A and the second slab material members 83B made of plastic foam and the first and second panels 81A, 81B. The urethane foam material-liquid is injected into and completely fills the area around the heat seal portion 67 of the vacuum insulation member 60 and the small gap of the adhered portion between the slab material members 83A, 83B and the members 60.

Then, the urethane foam material-liquid is expanded within the space, so as to complete the wall 80.

Similar to embodiment 1, the adhesive 85 applied to both sides of the vacuum insulation members 60 should be soft, so that the adhesive may be deformed (expanded) to correspond to the load added to the wall 80, or to reduce the stress to the aluminum-laminated film of the member 60.

As explained, the wall 80 and the method of manufacturing the same according to the present embodiment are advantageous in that the vacuum insulation members 60 are securely mounted in a position away from the inner and outer plates 81A, 81B with a predetermined distance (base hole size for riveting plus a clearance amount a) so that they receive little outer influence. Moreover, the insulating characteristics of the vacuum insulation members 60, positioned approximately at the center of thickness of the wall, will not be damaged by vibration, torsion or outer force. Therefore, a secure insulation is provided.

(Embodiment 3)

The present embodiment includes sandwiching the vacuum insulation member with slab materials, and forming a unit.

Figure 5:
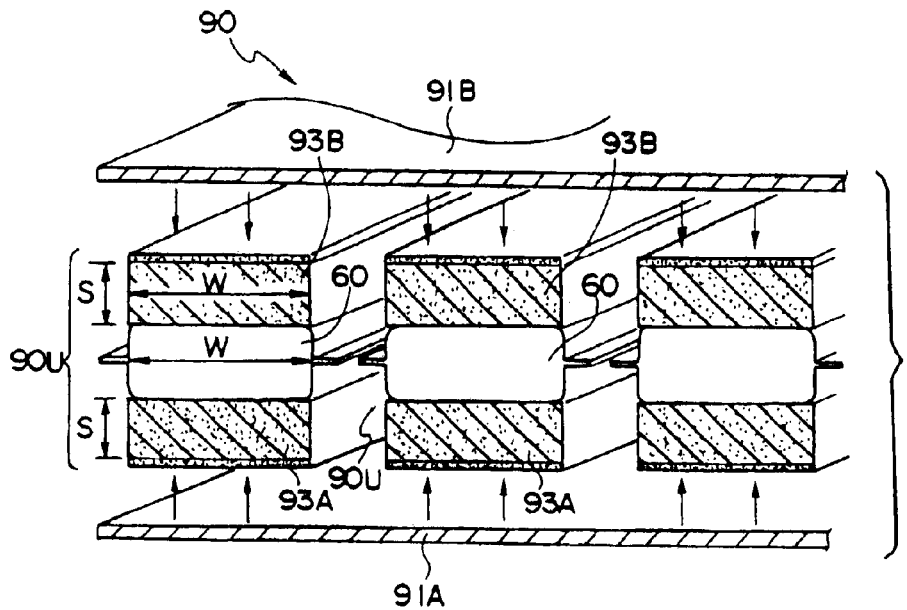
FIG. 5 is an explanatory view showing another embodiment of the invention.

The method of manufacturing the wall according to the present embodiment will now be explained with reference to FIG. 5.

(1) The vacuum insulation member 60 is sandwiched, via an adhesive, by pillar-shaped first and second slab material members 93A and 93B, both having the same width size as the width W of the vacuum insulation member 60 and a thickness S. Then, pressurized adhesion is performed thereto.

Thereby, a unit 90U formed by sandwiching the vacuum insulation unit 60 with hard plastic foam slab material members 93A and 93B is completed.

(2) The adhesive is applied to both sides of the unit 90U. The first panel 91A is a pressurized and adhered to the first slab material member 93A, and a second panel 91B is pressurized and adhered to the second slab material member 93B. The adhesive may be applied to the adhering side of the first and second panels 91A and 91B.

(3) After adhering the unit 90U and the first and second panels 91A and 91B, a urethane foam material-liquid is injected into the spaces surrounded by the unit 90U, the first panel 91A and the second panel 91B. The urethane foam is expanded within the spaces, thereby completing the wall 90.

According to the wall 90 including units 90U formed by sandwiching the vacuum insulation member 60 with slab materials 93A and 93B, it is easy to handle the vacuum insulation members 60.

(Embodiment 4)

Figure 6:
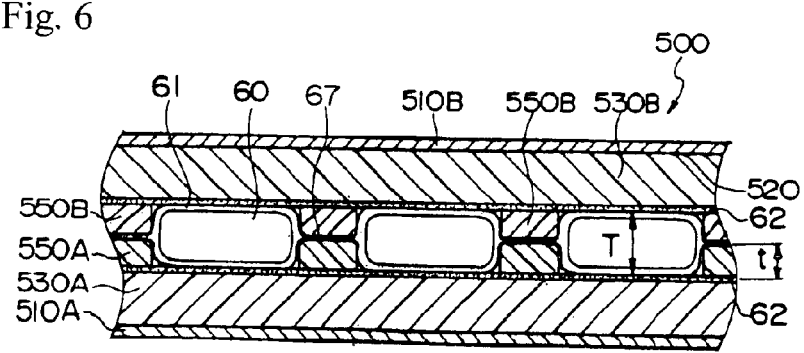
FIG. 6 is a cross-sectional view showing the wall according to embodiment 4 of the invention.

FIG. 6 is a cross-sectional view of a heat insulating wall according to embodiment 4 of the present invention.

A heat insulating wall 500 according to the present embodiment comprises a plate-shaped first slab material member 530A having an insulating effect and adhered to a first panel 510A, and a plate-shaped second slab material member 530B having an insulating effect and adhered to a second panel 510B. The plate-shaped slab material members 530A and 530B are formed of non-expanding plastic foam such as styrene foam or urethane foam or the like. The thickness S of the slab material members is set to be equal to or greater than the size of a base hole formed thereto for inserting fastening members plus a clearance amount (a). For example, when the size of the base hole in the embodiment is 15 mm, and the clearance amount (a) is set to 10 mm, the thickness S is equal to or greater than 25 mm.

An adhesive 520 for adhering the first and second panels 510A, 510B and the slab material members 530A and 530B is the same as that explained in embodiment 1.

Vacuum insulation members 60 are positioned between the first slab material member 530A adhered and fixed to the first panel 510A and the second slab material member 530B adhered and fixed to the second panel 510B, utilizing adhesive 62, with appropriate intervals between each member 60 so that they do not come into contact with one another.

Filling slab material members 550 are placed in the spaces surrounded by the first slab material member 530A, and second slab material member 530B, and the vacuum insulation members 60.

The filling slab material members 550 are formed of a non-expanding plastic foam such as a styrene foam or a urethane foam or the like, similar to the first and second slab material members 530A, 530B. The filling slab material members 550 include first filling slab material members 550A and second filling slab material members 550B.

The height t of each of the first and second filling slab material members 550A and 550B is set to approximately half the height T of the vacuum insulation member 60 (t=T/2). When the first and second filling slab material members 550A and 550B are superposed, their height equals the height of the vacuum insulation member 60.

Seal portions 67 of the vacuum insulation members 60 are sandwiched by the first filling slab material members 550A and the second filling slab material members 550B, which are adhered and fixed in position.

The method of manufacturing the wall 500 is explained now with reference to FIGS. 7A–7D.

(1) Slab material members 530A and 530B are adhered to plate 510A and plate 510B, respectively.

The plate-shaped slab material members 530A and 530B, made of non-expanding plastic foam (styrene foam, urethane foam, etc.) with a plate thickness S of approximately 25 mm, are adhered by an adhesive at their respective contact surfaces with the first and second panels 510A, 510B, respectively. Thereby, a first panel 510A to which the slab material member 530A is adhered, and a second panel 510B to which the slab material member 530B is adhered, are manufactured (refer to FIG. 7A).

(2) On top of the first slab material member 530A adhered to the first panel 510A are adhered the vacuum insulation members 60 and first filling slab material members 550A formed of non-expanding plastic foam. Since the height t of the first filling slab material member 550A is approximately half of the height T of the vacuum insulation member 60, the seal portion 67 of the vacuum insulation member 60 is placed on top of the first filling slab material member 550A. In this state, the width W of the first filling slab material member 550A is set so that the seal portions 67 of the proximate vacuum insulation members 60 do not come into contact with each other (when the length of the seal portion 67 is W, $W \geq 2w$) (refer to FIG. 7B).

(3) The second filling slab material member 550B formed of non-expanding plastic foam is mounted on the first filling slab material member 550A. Thereby, the seal portion 67 of the vacuum insulation member 60 is sandwiched between the first filling slab material member 550A and the second filling slab material member 550B.

Figure 7A:
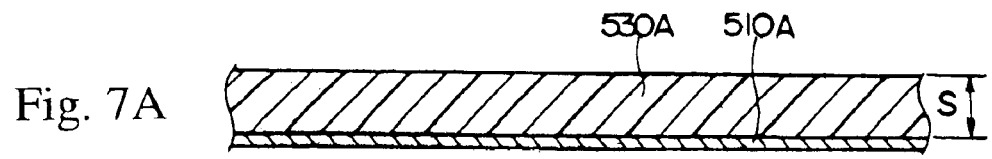
FIGS. 7A–7D are explanatory views showing the structure of FIG. 6.
Figure 7B:
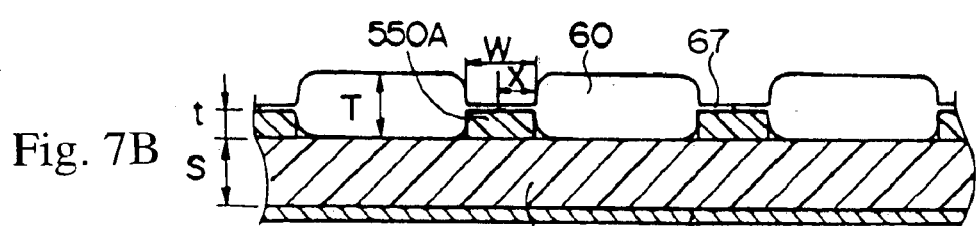
Figure 7C:
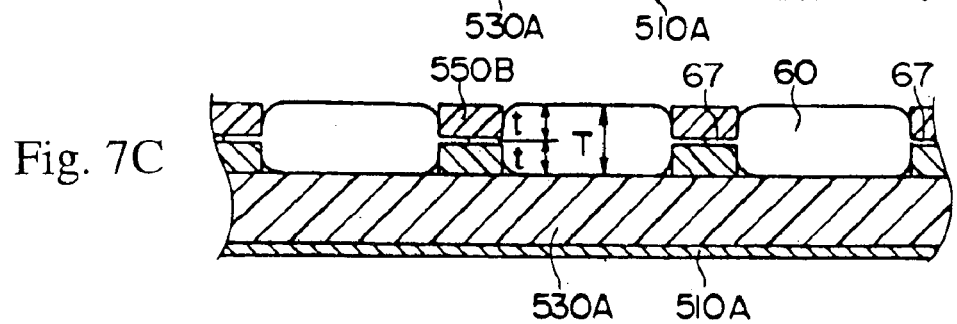

Since the first filling slab material member 550A and the second filling slab material member 550B, each having a height t, which is approximately half the height T of the member 60, are superposed, the second filling slab material member 550B and the vacuum insulation member 60 form a level surface (refer to FIG. 7C).

Figure 7D:
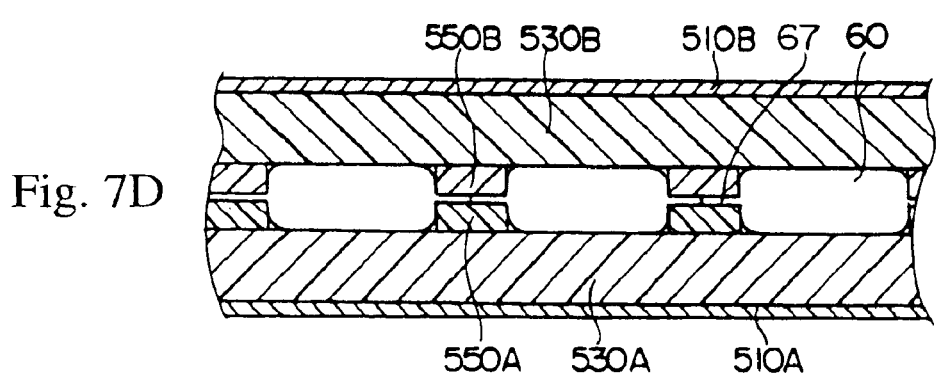

(4) The slab material member 530B formed of non-expanding plastic foam adhered to the second panel 510B is placed above the second filling slab material member 550B and the vacuum insulation members 60, and pressurized adhesion is provided thereto (refer to FIG. 7d).

The adhesive is either applied to the top surface of the vacuum insulation member 60 before pressurized adhesion, or the adhesive is applied to the whole surface of the slab material member 530B of the second panel 510B contacting the vacuum insulation member 60, before being placed on top of the member 60 for pressurized adhesion.

The heat insulating wall 500 and the method of manufacturing the same are advantageous in that the vacuum insulation members 60 may be securely mounted in a position away from the inner and outer plates 510A, 510B by a predetermined distance (base hole size for riveting plus a clearance amount a) so that they receive little outer influence. Moreover, the vacuum insulation members 60 positioned approximately at the center of thickness of the wall will not be damaged in their insulating characteristics by vibration, torsion or outer force. Therefore, a secure insulation is provided.

Even further, since the heat insulating wall 500 is constituted of the vacuum insulation members 60 and the formed slab material members 530, 550 made of non-expanding plastic foam, the problems related to the spaces generated when cooling the expanding urethane foam injected in the form of material-liquid into the wall are solved. According to the present embodiment, the outer appearance will be improved, the members may be assembled without any gaps, and the heat insulating effect will be improved. Moreover, a plurality of heat insulating walls may be manufactured by a single pressurization step.

(Embodiment 5)

The present embodiment relates to a unit structure comprising the vacuum insulation member and the slab material, and the method of manufacturing the same (refer to FIGS. 8 and 9.)

A heat insulating wall 700 shown in the present embodiment comprises units, each formed by sandwiching the seal portion 67 of the vacuum insulation member 60 by slab materials formed of non-expanding plastic foam.

The method of manufacturing the heat insulation wall 700 is now explained.

(1) A first panel 510A acting as the outer panel, to which a first plate-shaped slab (insulating) material member 530A made of a non-expanding plastic foam having a thickness of S (for example, approximately 25 mm) is adhered, and a second panel 510B acting as the inner panel, to which a second plate-shaped slab (insulating) material member 530B made of a non-expanding plastic foam having a thickness of S (for example, approximately 25 mm) is adhered, are manufactured.

(2) A vacuum insulation member unit 700U is formed (refer to FIGS. 9A–9D).

A cut slab material assembly 770 is adhered and fixed to the vacuum insulation member 60.

A cut slab material assembly 770 is made of a first cut slab material member 770a and a second cut slab material member 770b for sandwiching the seal portion 67 of the vacuum insulation member 60.

The first and second cut slab material members 770a and 770b are formed of non-expanding plastic foam such as a styrene foam or a urethane foam. The cut slab material members are pillar-shaped, with a height t half the height T of the vacuum insulation member 60 (t=T/2), and a width W equal to or a little longer than the width w of the seal portion 67 ($W \geq w$).

The seal portion 67 of the vacuum insulation member 60 is sandwiched between the first and second cut seal material members 770a, 770b, which are adhered and fixed in position, thereby forming the vacuum insulation member unit 700U (refer to FIGS. 9A and 9B).

(3) The vacuum insulation member units 700U are arranged on the first plate-shaped slab material member 530A of the first panel 510A, and adhered in position (refer to FIG. 9C).

(4) The second slab material member adhered to the second panel 510B is mounted and adhered, through an adhesive, on top of the vacuum insulation member units 700U (refer to FIG. 9D).

The adhesive shown in this embodiment is similar to that explained in embodiment 1.

The vacuum insulation member 60 being reinforced (on both sides) by the first and second cut slab material members 770a and 770b, is formed as a unit. The units are sandwiched between the first slab material member 530A, having a predetermined thickness and adhered to the first panel 510A, and the second slab material member 530B, having a predetermined thickness and adhered to the second panel 510B, so as to form the heat insulating wall 700.

Figure 10:
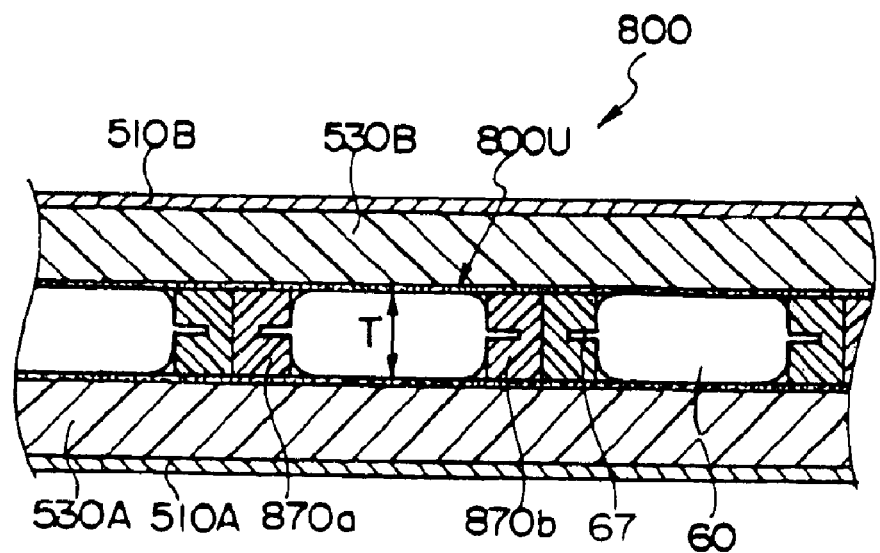
FIG. 10 is an explanatory view of yet another embodiment.
Figure 11:
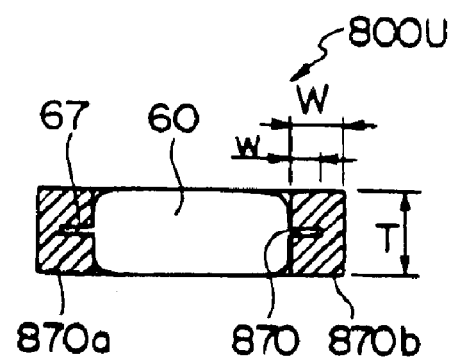
FIG. 11 is an explanatory view of the vacuum insulation member unit.
Figure 14:
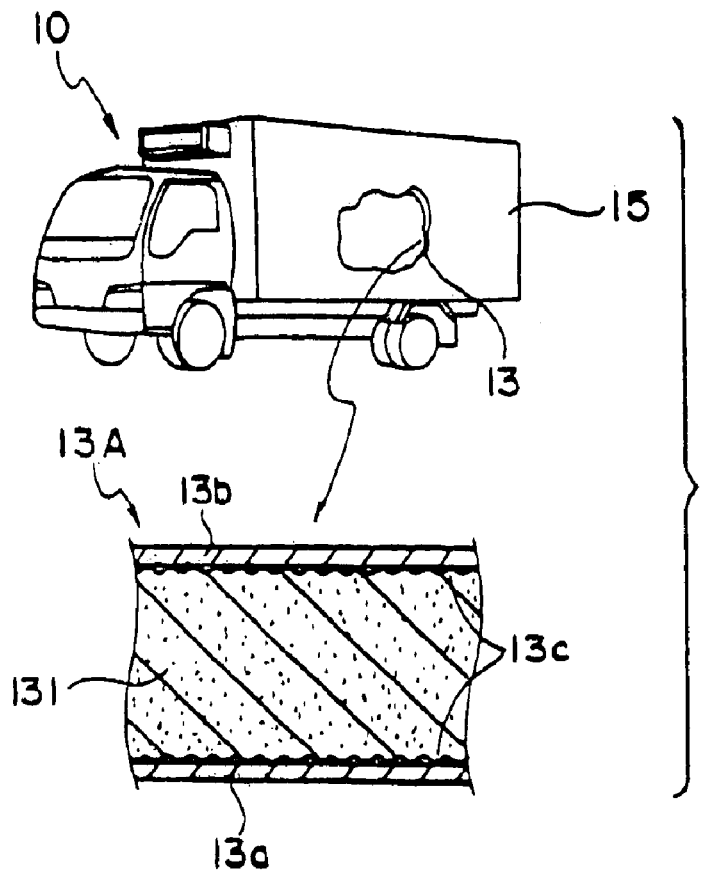
FIG. 14 is an explanatory view of a prior art heat insulating wall structure of a vehicle.
Figure 15:
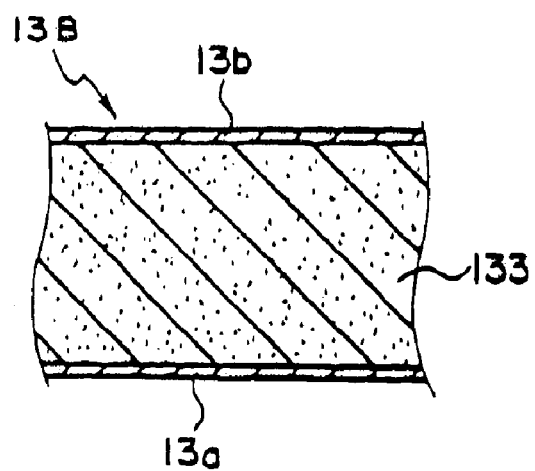
FIG. 15 is an explanatory view of another prior art heat insulating wall structure of a vehicle.
Figure 16:
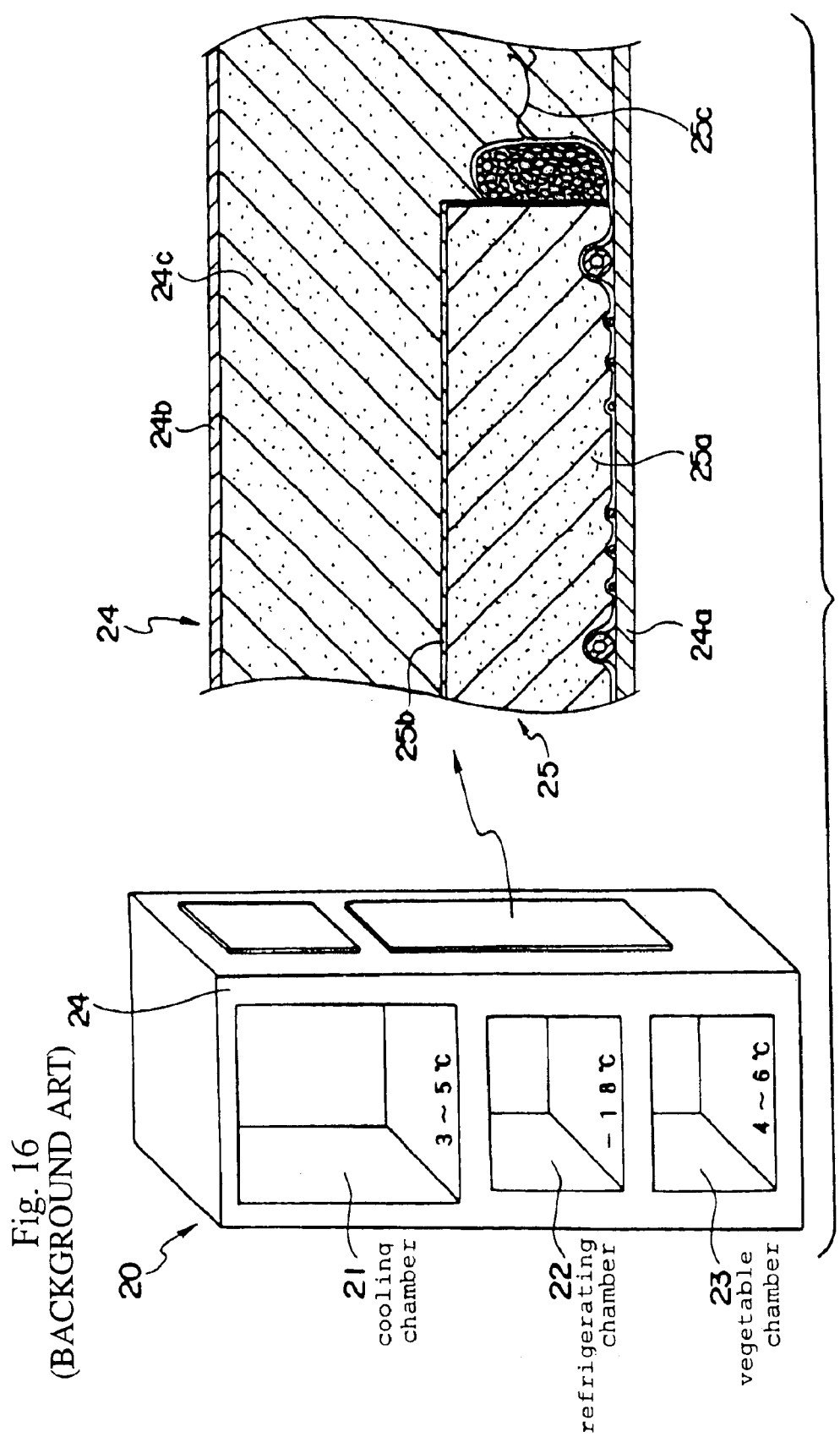
FIG. 16 is an explanatory view showing the wall structure of a domestic refrigerator.
Figure 17:
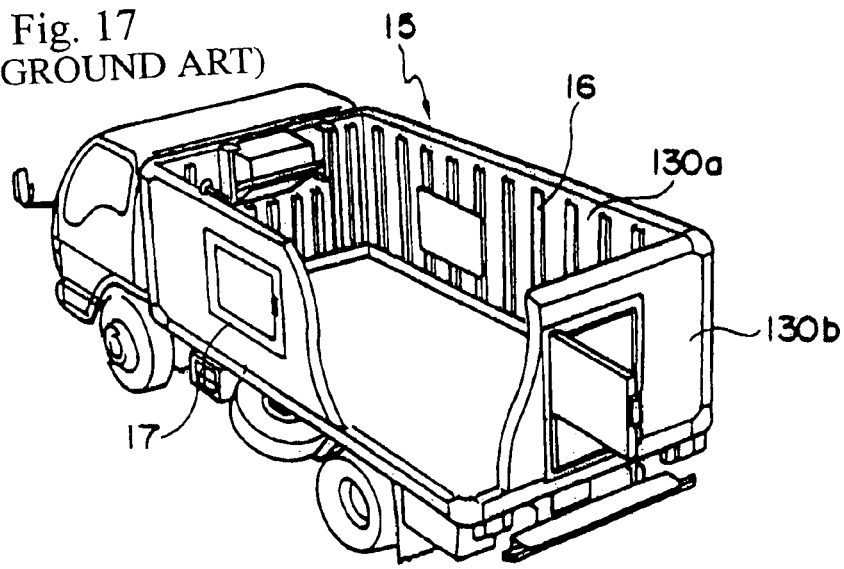
FIG. 17 is a perspective view of a vehicle.
Figure 18:
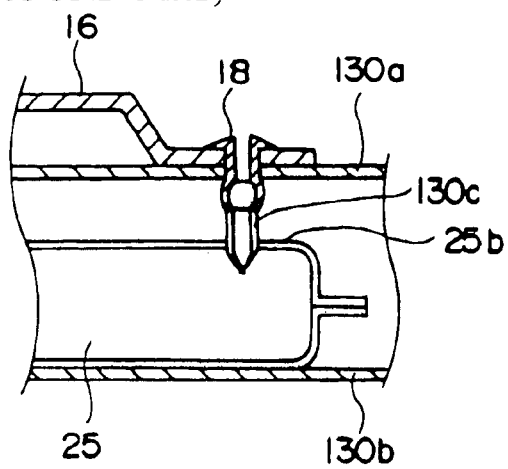
FIG. 18 is an explanatory view showing a fixed rivet according to the prior art.

Another embodiment of forming units comprising the vacuum insulation member 60 and the slab materials are shown in FIGS. 10 and 11.

A heat insulating wall 800 includes cut slab material members 870a, 870b which are each equipped with recess 870 for inserting the seal portion 67 of the vacuum insulation member 60.

The cut slab material members 870a, 870b are formed of a non-expanding plastic foam such as a styrene foam or a urethane foam. The height T of the pillar-shaped slab material members 870a, 870b is set to be the same as the height T of the vacuum insulation member 60, and the width W of the slab material members is equal to or a little longer than the length w of the seal portion 67 of the member 60 (W≧w). A recess 870 is formed in one side of each of the cut slab material members 870a and 870b. The recess 870 is a concave portion formed at approximately the center of height T, and with a length (depth) equal to the length w of the seal portion 65.

The cut slab material members 870a and 870b formed as above are positioned on both sides of the vacuum insulation member 60. At this time, the seal portions 67, 67 of the vacuum insulation member 60 are each inserted in the recess 870 formed in the cut slab material member 870a and the recess 870 formed in the cut slab material member 870b. The members are adhered and fixed in position.

The unit 800U shown in the present embodiment is formed so that the cut slab material member 870a is placed on one side of the vacuum insulation member 60, and the material member 870b is placed on the other side of the member 60.

Accordingly, the heat insulating walls 700 and 800 and the method of manufacturing the same shown in the above-mentioned embodiment are advantageous in that the most difficult and complicated steps of fixing the seal portion 67 of the vacuum insulation member 60 with the plastic slab materials in manufacturing a wall are simplified by forming units including the member 600. According to the present embodiment, the number of steps performed before the pressurization step is reduced, and the productivity as a whole is improved. Moreover, the vacuum insulation members may be securely mounted in a position away from the inner and outer plates 510A, 510B by a predetermined distance S (base hole size for riveting plus a clearance amount a) so that they receive little outer influence. Moreover, the vacuum insulation members 60 positioned approximately at the center of thickness of the wall will not be damaged in their insulating characteristics vibration, torsion or outer force. Therefore, a secure insulation is provided.

(Embodiment 6)

The present embodiment relates to vacuum insulation members being sandwiched between molded beaded-expansion styrene foam bodies, which are heat insulating materials (refer to FIGS. 12, 13).

A heat insulating wall 900 is formed by covering the vacuum insulation member 60 with a first storage body 950A and a second storage body 950B.

The first storage body 950A and the second storage body 950B are each equipped with a fitting portion 970 for fitting and storing the vacuum insulation member 60. The storage bodies 950A, B have a height H, and the fitting portion 970 has a depth t, which is close to half the height T of the vacuum insulation member 60 (t=T/2). The size S is a predetermined size, which is set to be equal to the base hole size for riveting plus some clearance. The other words, the height H of the storage body 950A is set to a predetermined size S plus half the height T of the vacuum insulation member 60 (H=S+T/2). Moreover, when denoting the width size of the vacuum insulation member 60 including the seal portions 67 as y, the width Y is equal to or a little longer than y, or Y≧y.

The first and second storage bodies 950A and 950B are molded and formed from a beaded-expansion styrene by use of a metallic mold.

The method of manufacturing the heat insulating wall 900 is now explained with reference to FIG. 13.

(1) The vacuum insulation member 60 is fitted to the fitting portion 970 of the first storage body 950A and adhered in position. The seal portions 67, 67 are mounted on the upper area of the storage body 950A (refer to FIGS. 13A and 13B).

(2) The second storage body 950B is mounted on the upper portion of the first storage body 950A, and adhered thereto. At this time, the exposed portion of the vacuum insulation member 60 is fit to the fitting portion 970 of the second storage body 950B. Thereby, the unit 900U is completed (refer to FIG. 13C).

(3) Units 900U are arranged and fixed on the first panel 510A. The second panel 510B is placed above the units 900U, in order to complete the wall 900 (refer to FIG. 13D).

The adhesive used in the present embodiment is similar to that explained in embodiment 1.

The heat insulating wall 900 includes units 900U formed by storing the vacuum insulation member 60 in the fitting portions 970, 970 formed in the first and second storage bodies 950A, 950B. The units are assembled by simple steps. Moreover, there is no need for slab materials utilized for positioning the vacuum insulation member 60, which makes it possible to reduce the number of components needed for manufacturing the wall 900 and to improve the productivity. Even further, the vacuum insulation members may be securely mounted in a position away from the inner and outer plates 510A, 510B by a predetermined distance S (base hole size for riveting plus a clearance amount a) so that they receive little outer influence. Moreover, the vacuum insulation members 60 positioned approximately at the center of thickness of the wall will not be damaged in their insulating characteristics by vibration, torsion or outer force. Therefore, a secure insulation is provided.

As explained, the heat insulating wall according to the present invention has the following advantages.

1. When the present wall is used as the wall for a heat insulating container of a vehicle, even when a great load is applied to the wall including serious deformation of the container caused by the vehicle driving on a rough path or riding over a curbstone and the like, the stress will not be conducted to the vacuum insulation member. The film will not be damaged by the deformation.

2. When the heat insulating wall is damaged from the inside or the outside of the container (for example, by claws of a fork lift, obstacles bumping on to the wall of the container, and the like,) the vacuum insulation members in the wall will not be damaged.

3. When there is need to fix parts to the inner and outer surfaces of the container (lashing rail, air rib, pallet guide, etc.), or mount rails and angle rivets (common pull-stem type) thereto, the forming of base holes (having a depth of approximately 15 mm) by a drill and inserting rivets in the holes will not damage the film of the vacuum insulation members in the wall. Therefore, the heat insulating characteristics of the wall will not be damaged.

Moreover, according to the present method of manufacturing the heat insulating wall, the vacuum insulation members can be positioned securely in the predetermined position within the inner and outer panels.

We claim:

1. A heat insulating wall, comprising:
    a vacuum insulation member having a first side and a second side and a vacuum insulation length;
    a first heat insulating member having a first side mounted on the first side of said vacuum insulation member and having a second side, said first heat insulating member extending at least as long as the vacuum insulation length of said vacuum insulation member;
    a first panel mounted on said second side of said first heat insulating member;
    a second heat insulating member having a first side mounted on the second side of said vacuum insulation member and having a second side, said second heat insulating member extending at least as long as the vacuum insulation length of said vacuum insulation member;
    a second panel mounted on said second side of said second heat insulation member; and
    a filler insulating material filling areas surrounded by said first heat insulating member, said vacuum insulation member, and said second heat insulating member.

2. The heat insulating wall according to claim 1, comprising a plurality of vacuum insulation members, and wherein each of said first heat insulating member and said second heat insulating member extends across said plurality of vacuum insulation members.

3. The heat insulating wall according to claim 1, comprising a plurality of vacuum insulation members, a like plurality of first heat insulating members, and a like plurality of second heat insulating members, each vacuum insulation member being positioned between one of said first heat insulating members and one of said second heat insulating members.

4. The heat insulating wall according to claim 1, wherein said first heat insulating member and said second heat insulating member are plate-shaped.

5. The heat insulating wall according to claim 1, wherein said first heat insulating member and said second heat insulating member are pillar-shaped.

6. The heat insulating wall according to claim 1, wherein said filler insulating material is formed of expanding plastic foam.

7. The heat insulating wall according to claim 1, wherein said filler insulating material is formed of non-expanding plastic foam, and said vacuum insulation member includes seal portions supported by said filler insulating material.

8. The heat insulating wall according to claim 7, wherein said filler insulating material comprises a first filler insulating material portion and a second filler insulating material portion, and said seal portions of said vacuum insulation member are sandwiched between said first filler insulating material portion and said second filler insulating material portion.

9. The heat insulating wall according to claim 1, wherein said vacuum insulation member includes seal portions, and said filler insulating material comprises seal support means for supporting said seal portions.

10. The heat insulating wall according to claim 9, wherein said seal support means comprises a first seal support portion and a second seal support portion, said first and second seal support portions sandwiching said seal portions.

11. The heat insulating wall according to claim 9, wherein said seal support means includes concave portions into which said seal portions of said vacuum insulation member are inserted.

12. The heat insulating wall according to claim 1, wherein each of the distance from said first panel to said vacuum insulation member and the distance from said second panel to said vacuum insulation member is equal to a depth of a base hole for inserting a fastening member plus a clearance amount.

13. A heat insulating wall, comprising:
    a plurality of first storage bodies, each first storage body having a first surface with a fitting portion therein and having a second surface;
    a like plurality of second storage bodies, each second storage body having a first surface with a fitting portion therein and having a second surface;
    a like plurality of vacuum insulation members, each vacuum insulation member positioned within the fitting portions of a respective one of said first storage bodies and a respective one of said second storage bodies;
    a first panel contacting the second surface of each of said first storage bodies; and
    a second panel contacting the second surface of each of said second storage bodies.

14. The heat insulating wall according to claim 13, wherein the distance from said first panel to the fitting portion of said first storage body, and the distance from said second panel to the fitting portion of said second storage body are both equal to a depth of a base hole for inserting a fastening member plus a clearance amount.

15. A method of manufacturing a heat insulating wall, comprising:
    mounting a first heat insulating member onto a first panel;
    mounting a second heat insulating member onto a second panel;
    mounting vacuum insulation members between said first and second heal insulating members; and
    injecting and expanding a liquid-plastic filler insulating material in a space formed between said first and second heating insulating members;
    wherein said vacuum insulation members are arranged with appropriate intervals therebetween so that proximal vacuum insulation members do not come into contact with each other.

16. The method of manufacturing a heat insulating wall according to claim 15, wherein each of said first heat insulating member and said second heat insulating member includes a fitting portion for storing said vacuum insulation members, and said vacuum insulation member mounting step comprises storing said vacuum insulation members in said fitting portions.

17. The method of manufacturing a heat insulating wall according to claim 15, wherein each of said vacuum insulation members is sandwiched between one of said first heat insulating members and one of said second heat insulating members before said heat insulating members are mounted on said first and second panels.

18. A method of manufacturing a heat insulating wall comprising:

mounting a first heat insulating member onto a first panel;

mounting a second heat insulating member onto a second panel;

mounting vacuum insulation members between said first and second heat insulating members; and positioning a non-expanding plastic foam filler insulating material into a space formed between said first and second heating insulating members so as to sandwich seal portions of said vacuum insulation members;

wherein said vacuum insulation members are arranged with appropriate intervals therebetween so that proximal vacuum insulation members do not come into contact with each other.

19. The method of manufacturing a heat insulating wall according to claim 18, wherein each of said first heat insulating member includes a fitting portion for storing said vacuum insulation members, and said vacuum insulation member mounting step comprises storing said vacuum insulation members in said fitting portions.

20. The method of manufacturing a heat insulating wall according to claim 18, wherein each of said vacuum insulation members is sandwiched between one of said first heat insulating members and one of said second heat insulating members before said heat insulating members are mounted on said first and second panels.

* * * * *